(12) United States Patent
Chen

(10) Patent No.: US 10,882,240 B2
(45) Date of Patent: Jan. 5, 2021

(54) BLOW-MOLDED LAMINATION CONTAINER AND MANUFACTURING METHOD THEREOF

(71) Applicant: SR PACKAGING INC. TAIWAN BRANCH (Seychelles), Taichung (TW)

(72) Inventor: Chia-Ching Chen, Taichung (TW)

(73) Assignee: SR PACKAGING INC. TAIWAN BRANCH (SEYCHELLES), Taichung (TW)

( * ) Notice: Subject to any disclaimer, the term of this patent is extended or adjusted under 35 U.S.C. 154(b) by 54 days.

(21) Appl. No.: 16/528,085

(22) Filed: Jul. 31, 2019

(65) Prior Publication Data

US 2020/0047394 A1 Feb. 13, 2020

(30) Foreign Application Priority Data

Aug. 7, 2018 (TW) ............................. 107127452 A

(51) Int. Cl.
| | |
|---|---|
| *B65D 1/02* | (2006.01) |
| *B29C 49/22* | (2006.01) |
| *B29C 49/50* | (2006.01) |
| B29L 31/00 | (2006.01) |
| B29C 49/06 | (2006.01) |

(52) U.S. Cl.
CPC .............. *B29C 49/22* (2013.01); *B29C 49/50* (2013.01); *B65D 1/0215* (2013.01); *B65D 1/0284* (2013.01); *B29C 49/06* (2013.01); *B29L 2031/712* (2013.01)

(58) Field of Classification Search
CPC ....... B29C 49/22; B29C 49/50; B65D 1/0215; B65D 1/0284; B65D 83/0055; B05B 11/00412
See application file for complete search history.

(56) References Cited

U.S. PATENT DOCUMENTS

| | | | | |
|---|---|---|---|---|
| 4,469,250 A | * | 9/1984 | Evezich | ............. B65D 83/0055 222/83.5 |
| 5,301,838 A | * | 4/1994 | Schmidt | ............... B67D 1/0462 222/105 |
| 5,989,482 A | * | 11/1999 | Sagawa | ................... B29C 49/22 264/515 |
| 6,083,450 A | | 7/2000 | Safian | |

(Continued)

FOREIGN PATENT DOCUMENTS

| | | |
|---|---|---|
| CN | 1273512 | 11/2000 |
| CN | 105228909 | 1/2016 |

(Continued)

*Primary Examiner* — Robert B Davis
(74) *Attorney, Agent, or Firm* — WPAT, PC

(57) ABSTRACT

A blow-molded lamination container includes an outer layer and an inner layer. The outer layer has a bottom and an air-inletting seam. The air-inletting seam is disposed through the bottom of the outer layer, and is formed from a tapering opening by cooling shrinkage. The inner layer is disposed in the outer layer, is capable of being filled with a content and contracts with respect to the outer layer, and is not nipped within the air-inletting seam by the outer layer. A width of a widest portion of the air-inletting seam is at least twice greater than a width of a narrowest portion of the air-inletting seam. A manufacturing method for the blow-molded lamination container is also provided.

13 Claims, 13 Drawing Sheets

(56) References Cited

U.S. PATENT DOCUMENTS

| | | | | |
|---|---|---|---|---|
| 2002/0182351 A1* | 12/2002 | Akiyama | ................ | B29B 11/14 |
| | | | | 428/35.7 |
| 2004/0188462 A1* | 9/2004 | Decottignies | ......... | B05B 11/046 |
| | | | | 222/105 |
| 2007/0040306 A1* | 2/2007 | Morel | ............... | B05B 11/00412 |
| | | | | 264/514 |

FOREIGN PATENT DOCUMENTS

| | | | | |
|---|---|---|---|---|
| CN | 106414251 | | 2/2017 | |
| CN | 107000897 | | 8/2017 | |
| CN | 107207114 | | 9/2017 | |
| JP | H05310265 | | 11/1993 | |
| JP | H11208633 | | 8/1999 | |
| JP | 2011230817 | | 11/2011 | |
| WO | WO-2015133237 A1 * | | 9/2015 | ............. B65D 23/02 |

* cited by examiner

BLOW-MOLDED LAMINATION CONTAINER AND MANUFACTURING METHOD THEREOF

BACKGROUND OF THE INVENTION

1. Field of the Invention

The present invention relates to a blow-molded lamination container and a manufacturing method thereof, and more particularly to a blow-molded lamination container that is easy to be produced.

2. Description of Related Art

A conventional lamination container comprises an outer layer and an inner layer. The inner layer is disposed on an inner side of the outer layer and may contract from the outer layer. With reference to Taiwan Patent No. 1570029 and Patent No. I602683, the conventional lamination container has a complex structure, and a manufacturing method thereof is troublesome as a result. Therefore, the conventional lamination container has a high production cost, which should be improved.

Furthermore, Taiwan patent No. 504451 (451') disclosed a process for production of a container provided with a pressure equalization opening and containers produced according to this process. Each container comprises a container body and an inner pouch disposed therein. The container body has a pressure equalization opening at a bottom of the container body. The conventional container is produced by co-extrusion between two opened halves of a blow mold. An outwardly-projecting base seam is formed, and excess material in the base area of the container that is to be manufactured is squashed out in such a way that the material of the container body which is in contact with the area of the seam is welded together. A tube which forms the inner pouch is clamped, axially fixed and welded between wall sections of the container body, and the inner pouch is subjected to pressure so that the pressure equalization opening is formed.

However, by the manufacturing method of 451', the conventional container must be applied with pressure for the pressure equalization opening to be formed after the container body and the inner pouch are made, so processes of the manufacturing method are troublesome. Besides, since the inner pouch is welded with the wall sections of the container body, after the container is subjected to pressure and the pressure equalization opening is formed, the inner pouch is still partially welded with the wall sections of the container body. The pressure equalization opening is thereby partially occupied, and has a smaller cross-sectional area for little air to pass through.

SUMMARY OF THE INVENTION

The main objective of the present invention is to provide a blow-molded lamination container and a manufacturing method thereof, which simplifies manufacturing processes of the blow-molded lamination container and save the production cost as well.

A blow-molded lamination container comprises an outer layer and an inner layer. The outer layer has a bottom and an air-inletting seam. The air-inletting seam is disposed through the bottom of the outer layer, and is formed from a tapering opening by cooling shrinkage. The inner layer is disposed in the outer layer, is capable of being filled with a content and contracts with respect to the outer layer, and is not nipped within the air-inletting seam by the outer layer. A width of a lower side portion of the air-inletting seam is at least twice greater than a width of an upper side portion of the air-inletting seam.

A manufacturing method of a blow-molded lamination container is also provided, and comprises the following steps:

preparing a laminated tube comprising an outer layer and an inner layer;

setting the laminated tube in a mold composed of two halves, wherein one of the two halves has a cutting tool movably mounted thereon;

clamping the two halves of the mold, and making the outer layer and the inner layer of the laminated tube compressed by bottoms of the two halves and joined;

inserting a nozzle and injecting air into the laminated tube from a top end thereof, and pushing the laminated tube out to match the two halves of the mold to be shaped into a blow-molded lamination container;

moving the cutting tool, cutting off residues of the outer layer and the inner layer, and engraving an opening with a triangular cross section on a bottom of the outer layer; and opening the mold, taking out the blow-molded lamination container, and generating an air-inletting seam from the opening with a triangular cross section;

wherein the inner layer is not nipped within the air-inletting seam by the outer layer.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
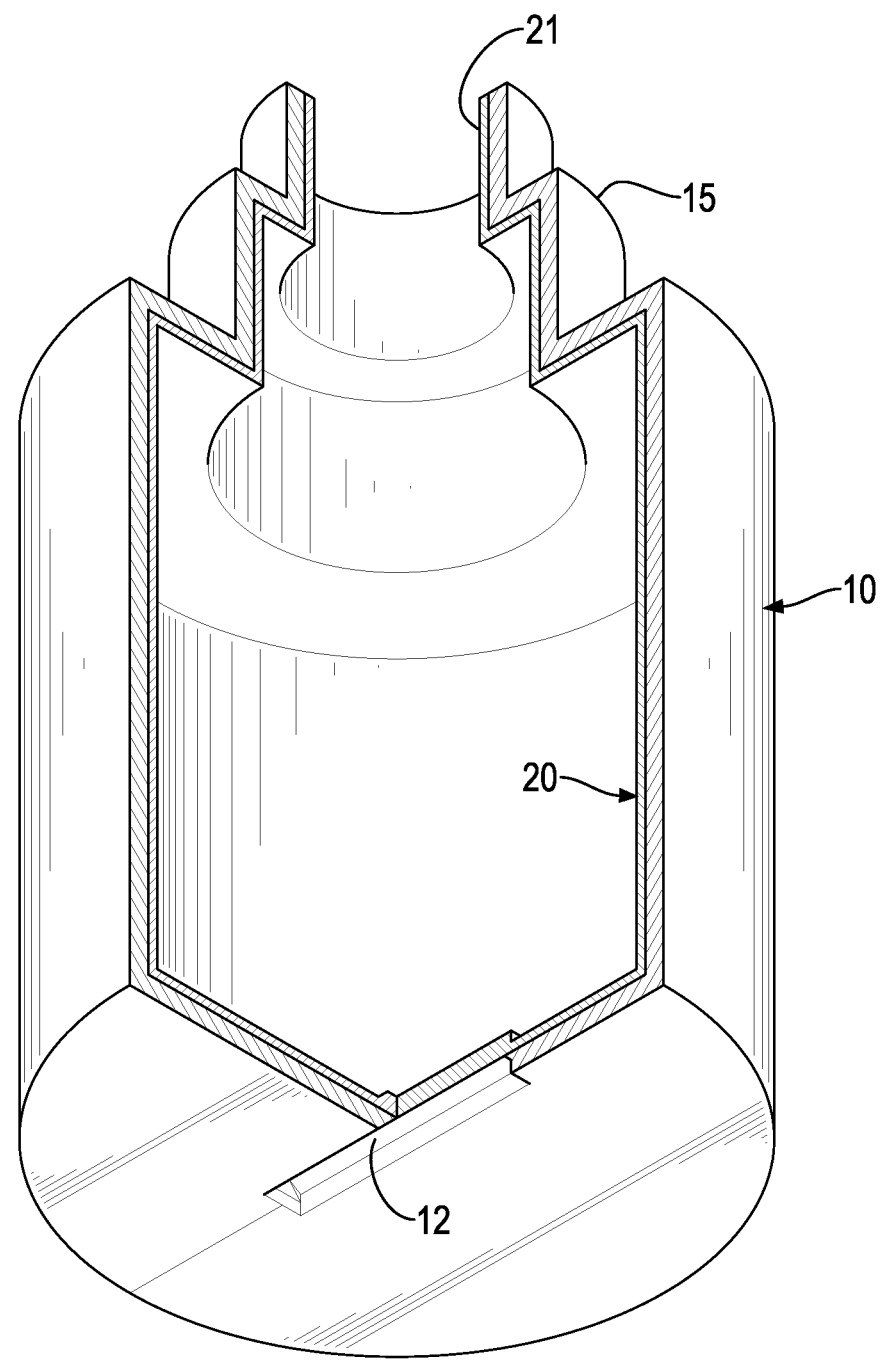
FIG. 1 is a perspective view in partial section of a first embodiment of a blow-molded lamination container in accordance with the present invention.

With reference to FIG. 1, a first embodiment of a blow-molded lamination container in accordance with the present invention comprises an outer layer 10 being a container body and an inner layer 20 disposed in the outer layer 10. The inner layer 20 is a pouch that may be filled with a content such as gel, liquid, or ointment. As the content is extruded and decreases, the inner layer 20 would be pinched and contract from the outer layer 10. The outer layer 10 has an air-inletting seam 12 disposed through a bottom of the outer layer 10 on a parting line of the outer layer 10. The air-inletting seam 12 has an opening with a cross section tapering from bottom to top of the outer layer 10. When the content in the inner layer 20 is squeezed out, the tapering air-inletting seam 12 may enlarge a difference in pressure between an outside and an inside of the outer layer 10. Because the pressure of the inside is smaller than the pressure of the outside of the outer layer 10, air may easily flow into the outer layer 10 through the tapering air-inletting seam 12. Moreover, the inner layer 20 is not nipped within the air-inletting seam 12 by the outer layer 10, and thereby the air-inletting seam 12 may be fully void for air flow to pass through. In comparison with the partially occupied pressure equalization opening of the conventional container, the outer layer 10 may draw in more air flowing through the air-inletting seam 12 due to the principle that the larger the cross-sectional area, the less resistance, so as to compensate the pressure difference of the blow-molded lamination container. The pressure difference provided by the tapering air-inletting seam 12 may also prevent inverse air flow from the inside of the outer layer 10 of the blow-molded lamination container. This technical feature enhances the inner layer 20 to contract and to squeeze out the content.

Figure 11:
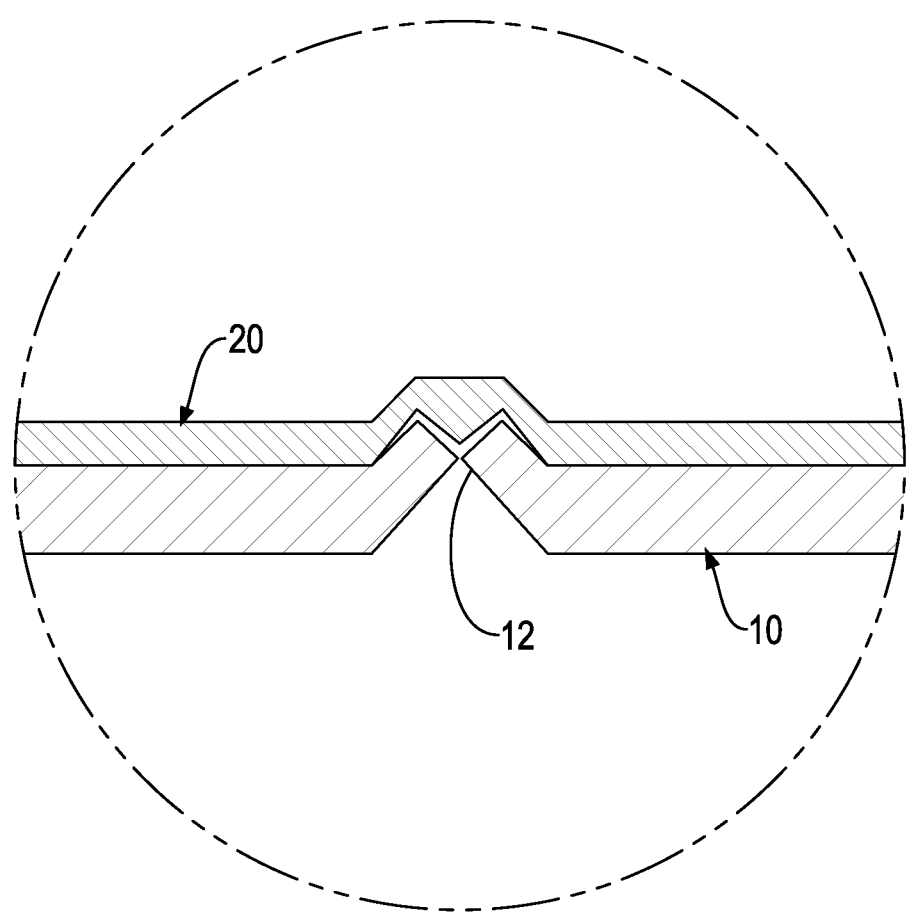
FIG. 11 is an enlarged side view showing how the air-inletting seam is formed in FIG. 10.

Moreover, a width of a widest portion, namely a lower side portion, of the air-inletting seam 12 is at least twice greater than a width of a narrowest portion, namely an upper side portion, of the air-inletting seam 12. As a consequence, a ratio of the difference in air pressure between the lower side portion and the upper side portion of the air-inletting seam 12 is also at least twice. In other words, the pressure at the lower side portion is at least twice greater than the pressure at the upper side portion. That ratio makes air much easier to flow into a space between the outer layer 10 and the inner layer 20. With reference to FIG. 11, the narrowest portion (the upper side portion) of the air-inletting seam 12 is so narrow that the cross section of the air-inletting seam 12 is approximately a triangle, so as to prevent inverse air flow from the inside of the outer layer 10. This structure makes the air-inletting seam 12 easier to be formed via cooling shrinkage.

Figure 2:
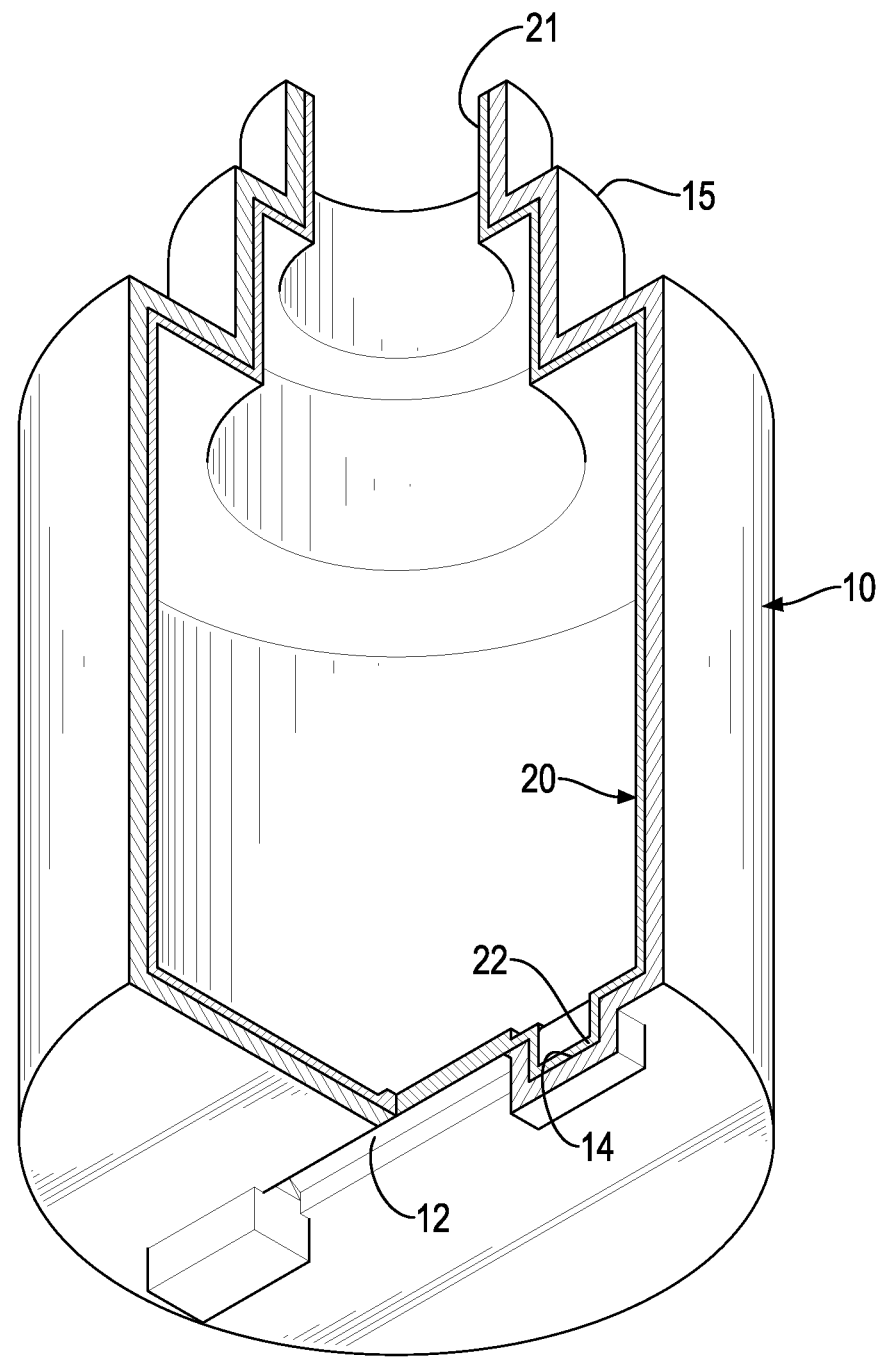
FIG. 2 is a perspective view in partial section of a second embodiment of a blow-molded lamination container in accordance with the present invention.
Figure 3:
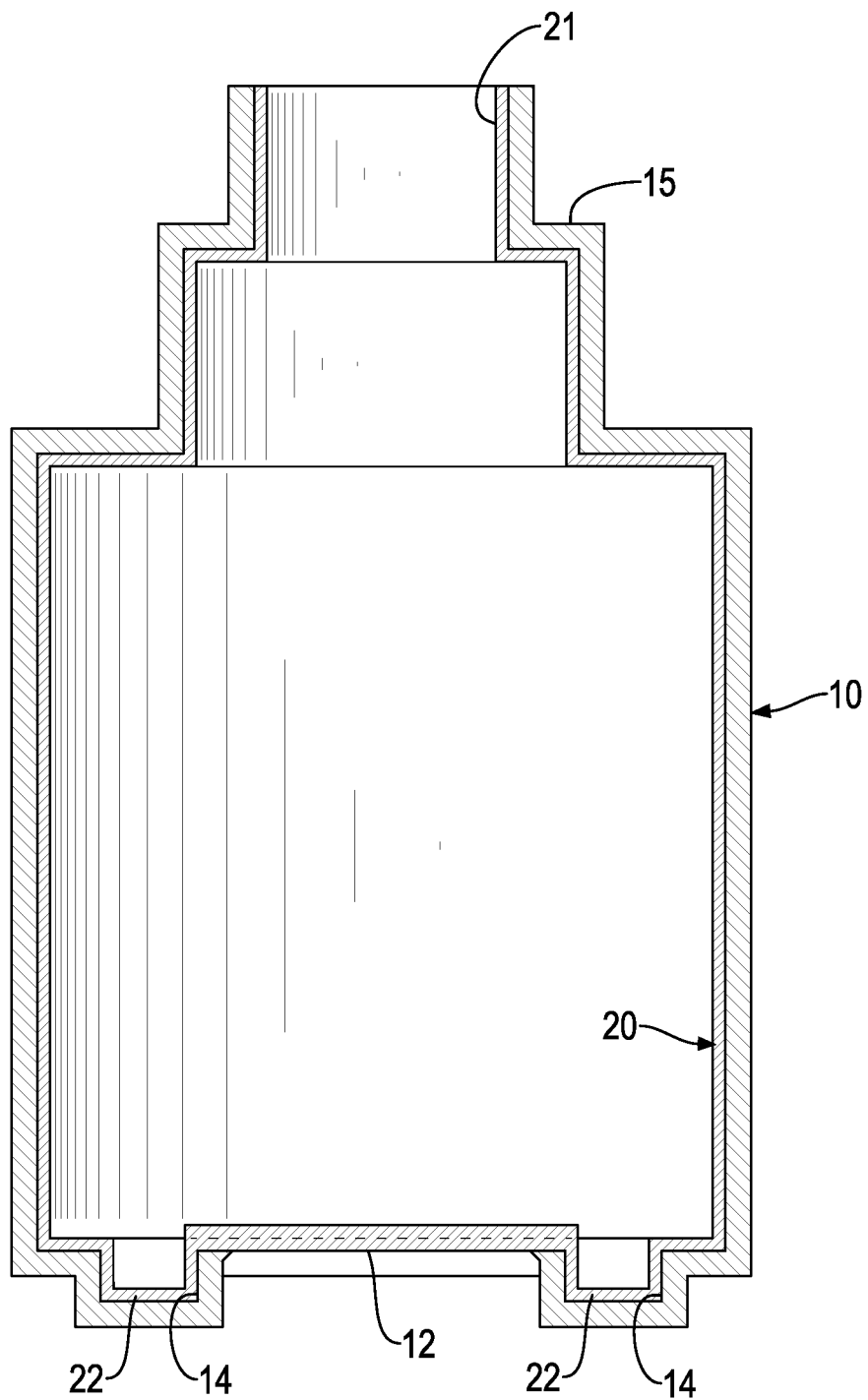
FIG. 3 is a cross-sectional side view of the blow-molded lamination container in FIG. 2.
Figure 4:
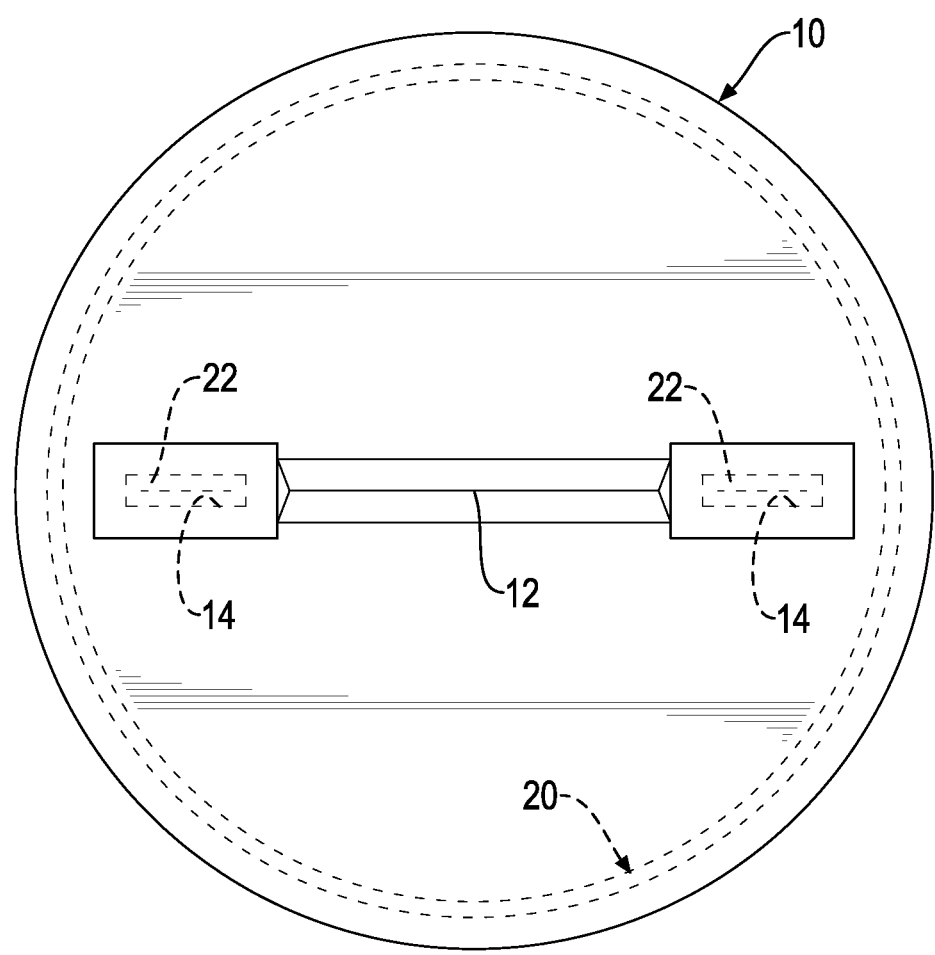
FIG. 4 is a bottom view of the blow-molded lamination container in FIG. 2.
Figure 5:
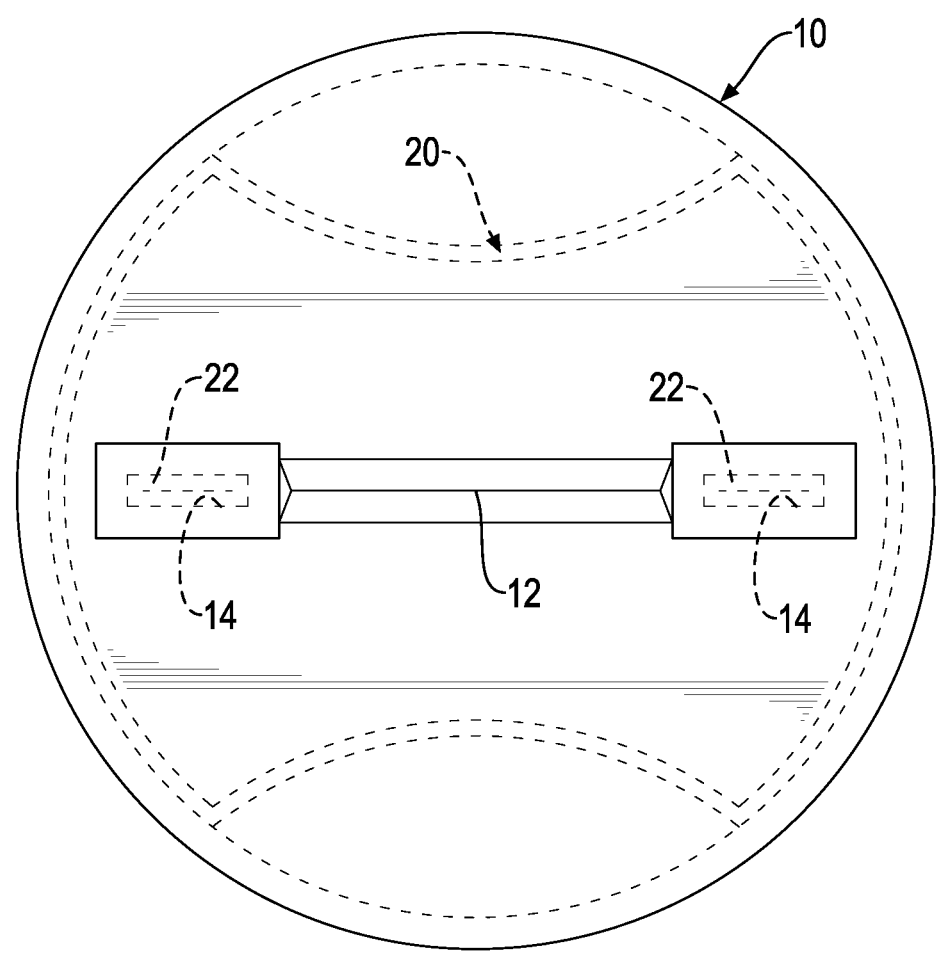
FIG. 5 is an operational view showing contraction of an inner bag of the blow-molded lamination container in FIG. 4.
Figure 6:
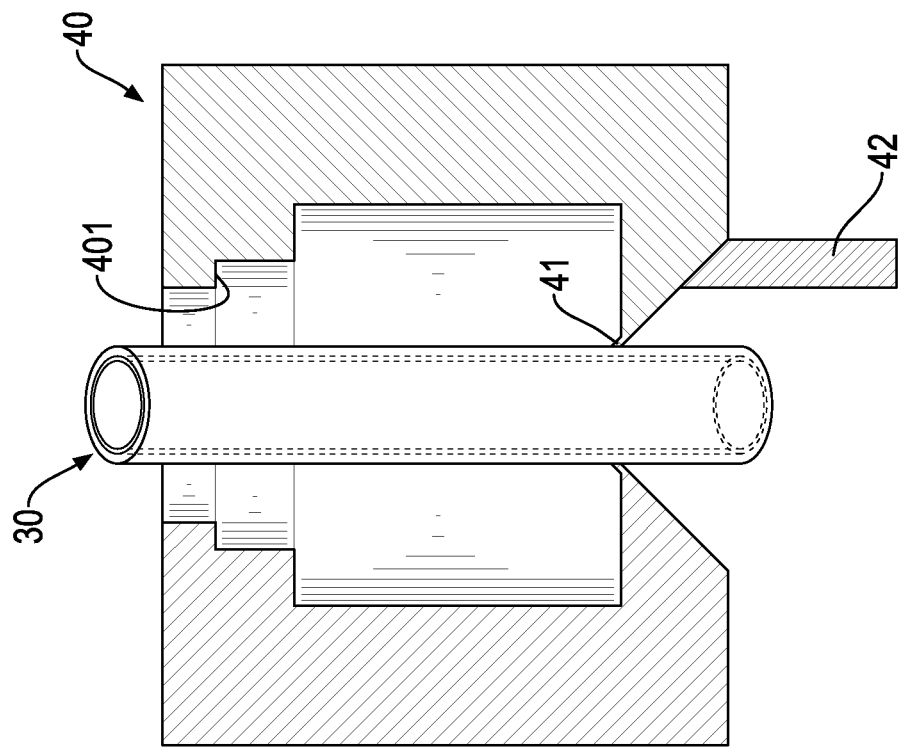
FIGS. 6 to 9 are side views in partial section showing processes of a manufacturing method of the blow-molded lamination container in accordance with the present invention.
Figure 6:
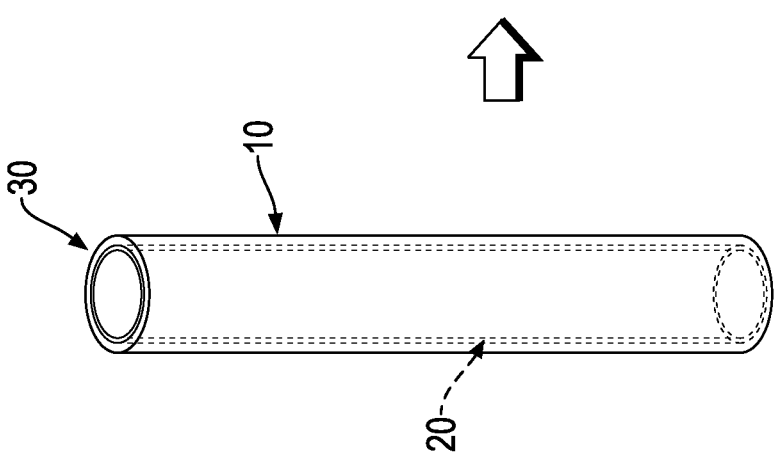

With reference to FIGS. 2 to 4, in a second embodiment of a blow-molded lamination container in accordance with the present invention, the outer layer 10 has two positioning protrusions 14 protruding on the bottom of the outer layer 10 at a spaced interval. Each one of the two positioning protrusions 14 forms a groove on an inner side of the outer layer 10. The inner layer 20 has two positioning grooves 22. Each one of the two positioning grooves 22 is nipped in a respective one of the two positioning protrusions 14. With reference to FIG. 5, by the two positioning grooves 22 being nipped, the inner layer 20 may contract in a restricted way. More particularly, the inner layer 20 may shrink and deform with respect to the outer layer 10 in a regular direction. For example, the inner layer 20 shrinks and deforms from top and bottom toward a center of the inner layer 20 as shown in FIG. 5. Deformations in a regular direction may sufficiently squeeze to discharge the content in the inner layer 20 so as to prevent wasted residue of the content caused by irregular deformation of the inner layer 20.

Preferably, the two positioning protrusions 14 along with the corresponding positioning grooves 22 are disposed at two ends of the air-inletting seam 12. By doing so, the inner layer 20 may contract and shrink along a direction that is perpendicular to a direction in which the air-inletting seam 12 extends.

Furthermore, with reference to FIGS. 1 to 3, the outer layer 10 has a flange 15 formed near a top of the outer layer 10. The inner layer 20 has a circular discharge opening 21 formed through a top of the inner layer 20.

Figure 9:
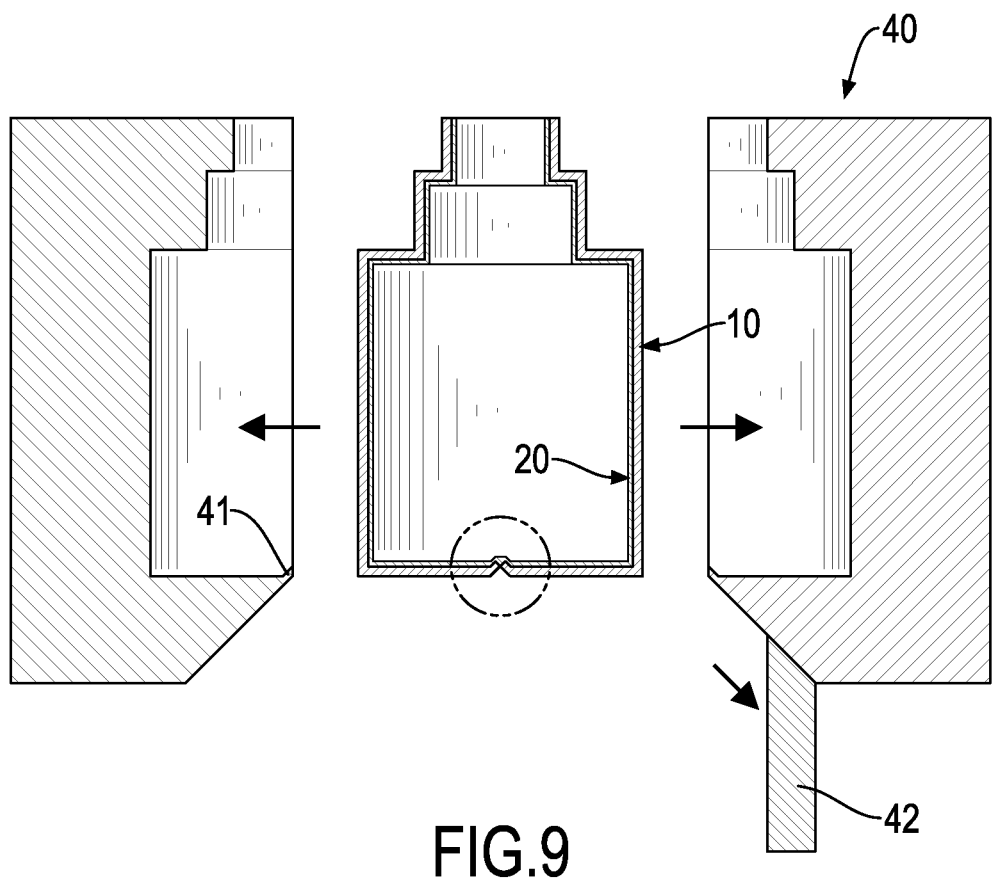
Figure 9A:
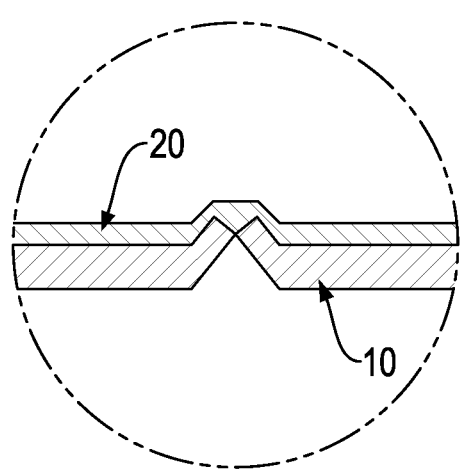
FIG. 9A is an enlarged side view in partial section of the blow-molded lamination container in FIG. 9.
Figure 12:
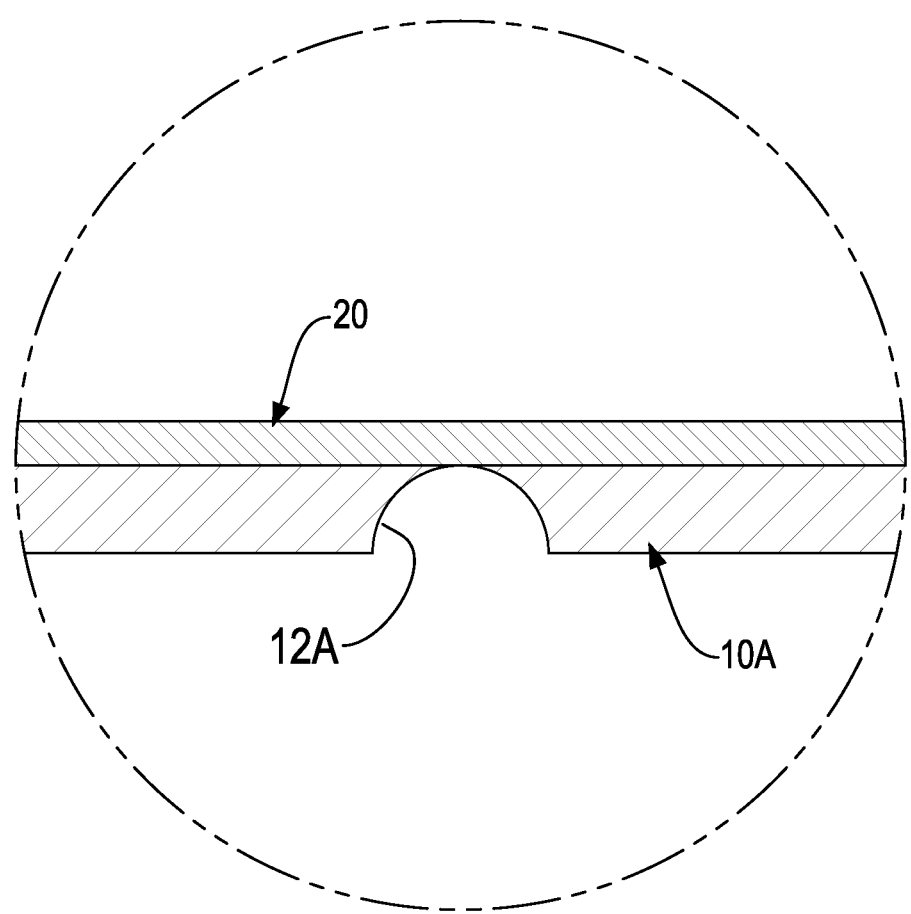
FIG. 12 is an enlarged side view of a third embodiment of a blow-molded lamination container in accordance with the present invention.
Figure 13:
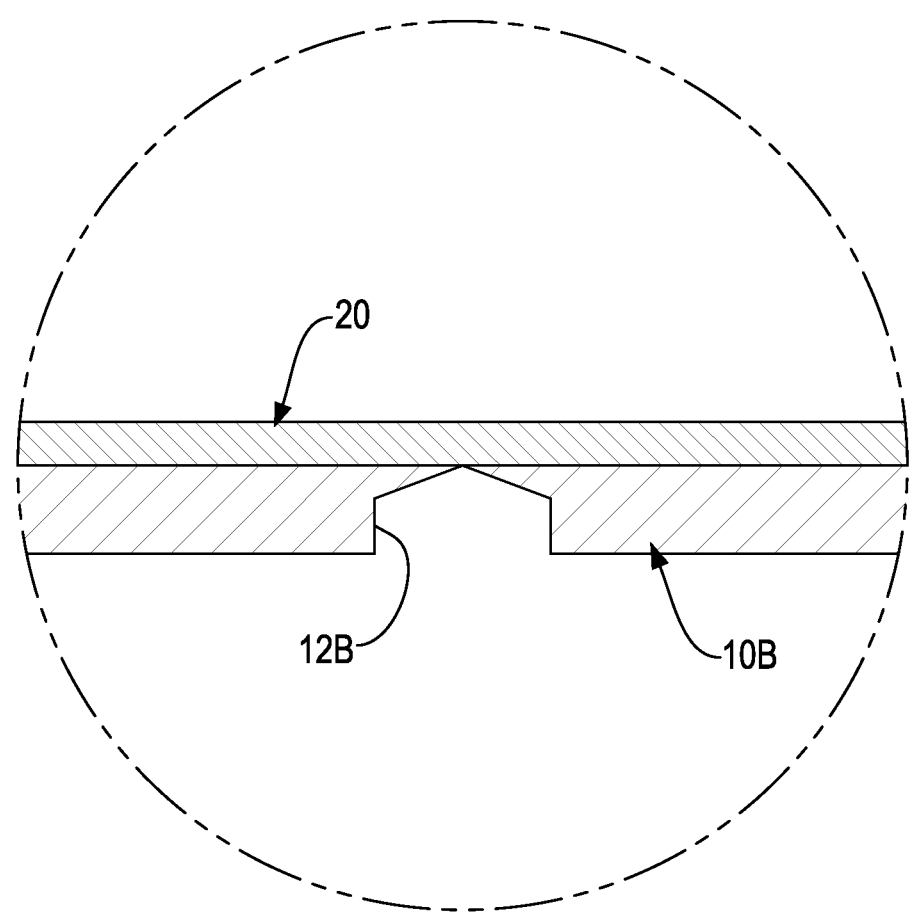
FIG. 13 is an enlarged side view of a fourth embodiment of a blow-molded lamination container in accordance with the present invention.

With reference to FIGS. 9 and 11, the cross section of the opening of the air-inletting seam 12 may be triangular. With reference to FIG. 12, the cross section of the opening of the air-inletting seam 12A may also be formed as a semicircle. With reference to FIG. 13, the cross section of the opening of the air-inletting seam 12B may also be formed as a polygon.

With reference to FIGS. 6 to 9, the present invention further provides a manufacturing method of a blow-molded lamination container, which comprises the following steps:

A preparing step: prepare a laminated tube 30 comprising an outer layer 10 and an inner layer 20.

Figure 10:
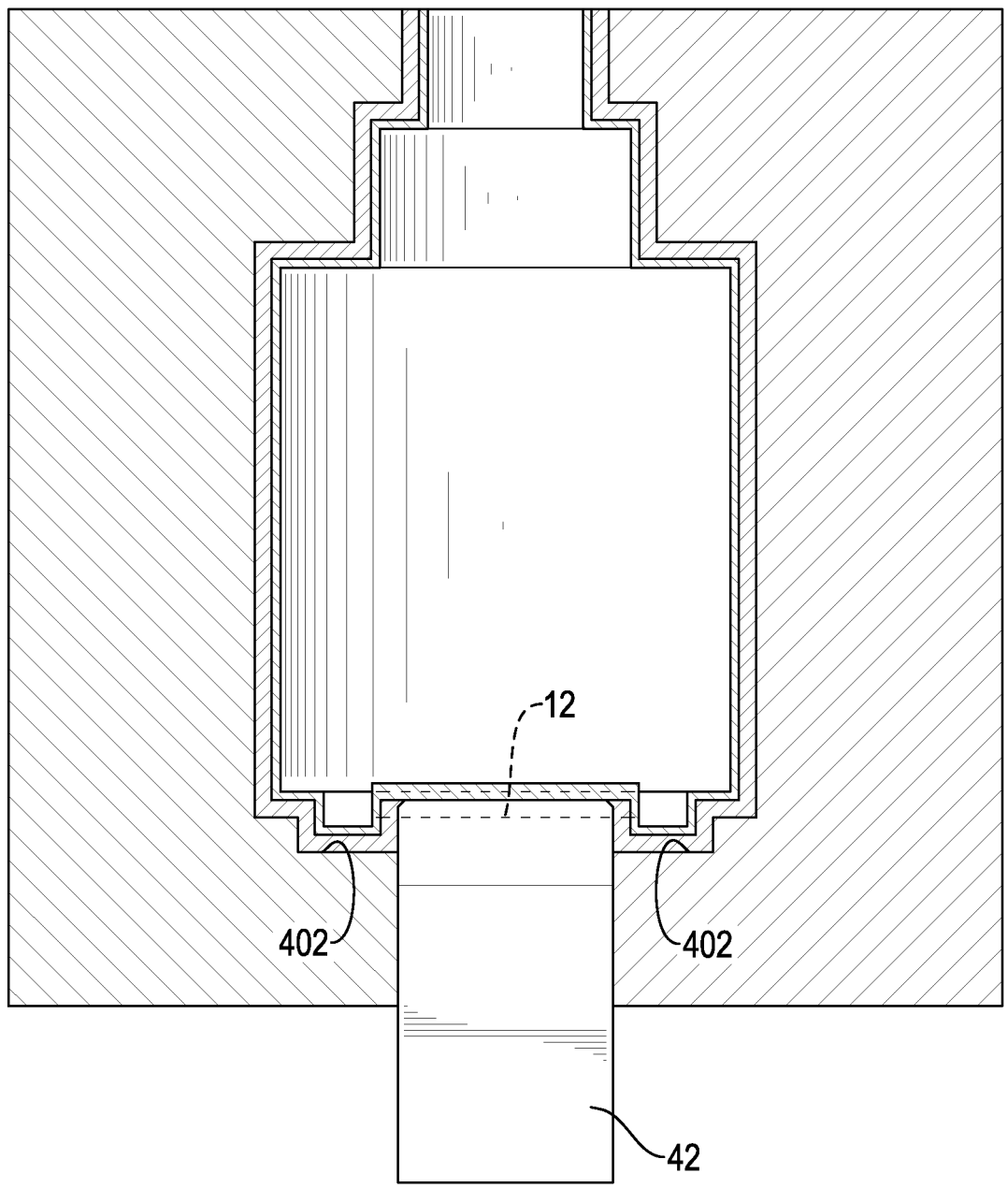
FIG. 10 is a side view in partial section showing a cutting tool cutting an air-inletting seam on the blow-molded lamination container in FIGS. 6 to 9.

A setting step: set the laminated tube 30 in a mold which is composed of two halves 40. The two halves 40 are separable. Each one of the two halves 40 has a protrusion 41 inclined toward an interior of the two halves 40 of the mold. One of the two halves 40 has a cutting tool 42 mounted thereon, and the cutting tool 42 is upwardly and downwardly movable with respect to the corresponding half 40. Moreover, each one of the two halves 40 has a stepped groove 401 formed near a top of the half 40. With reference to FIG. 10, each one of the two halves 40 may have a mold groove 402, respectively. The mold groove 402 is disposed on a bottom of the half 40.

Figure 7:
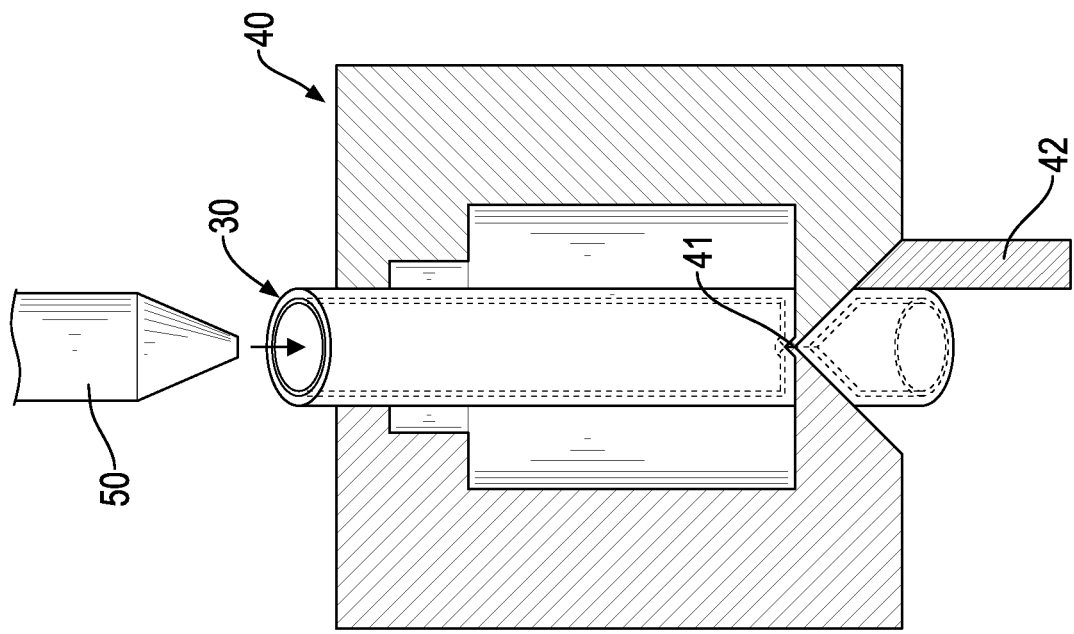
Figure 7:
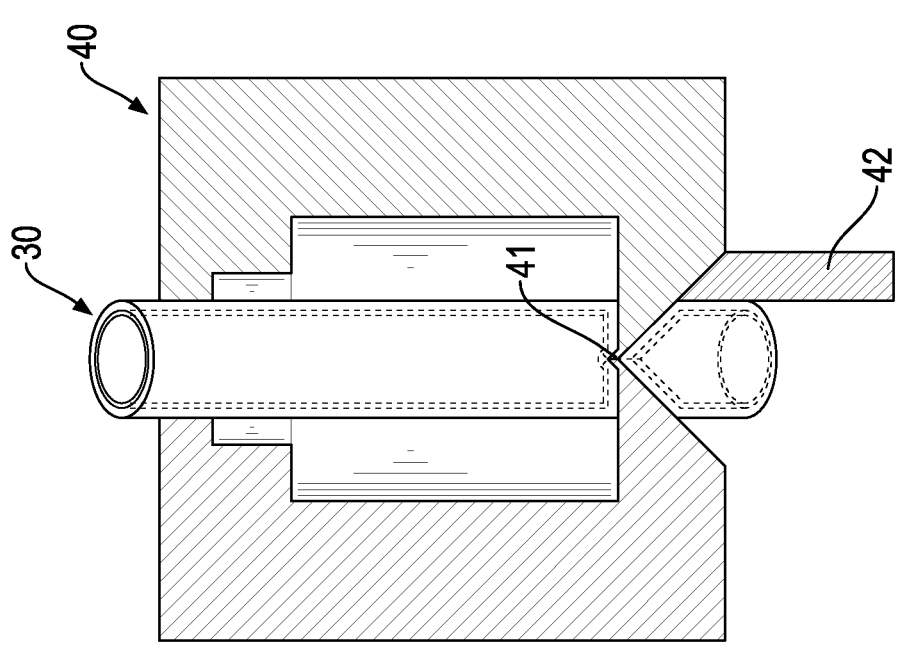

A clamping step: clamp the two halves 40 of the mold. The bottoms of the two halves 40 thereby abut against and compress the laminated tube 30, and a parting line is formed near a bottom end of the laminated tube 30 as the outer layer 10 and the inner layer 20 are joined. The protrusions 41 of the two halves 40 of the mold push the laminated tube 30 toward the interior of the mold, so a central part near the bottom of the laminated tube 30 is extruded inwardly and upwardly with respect to the two halves 40, as shown in FIG. 7.

Figure 8:
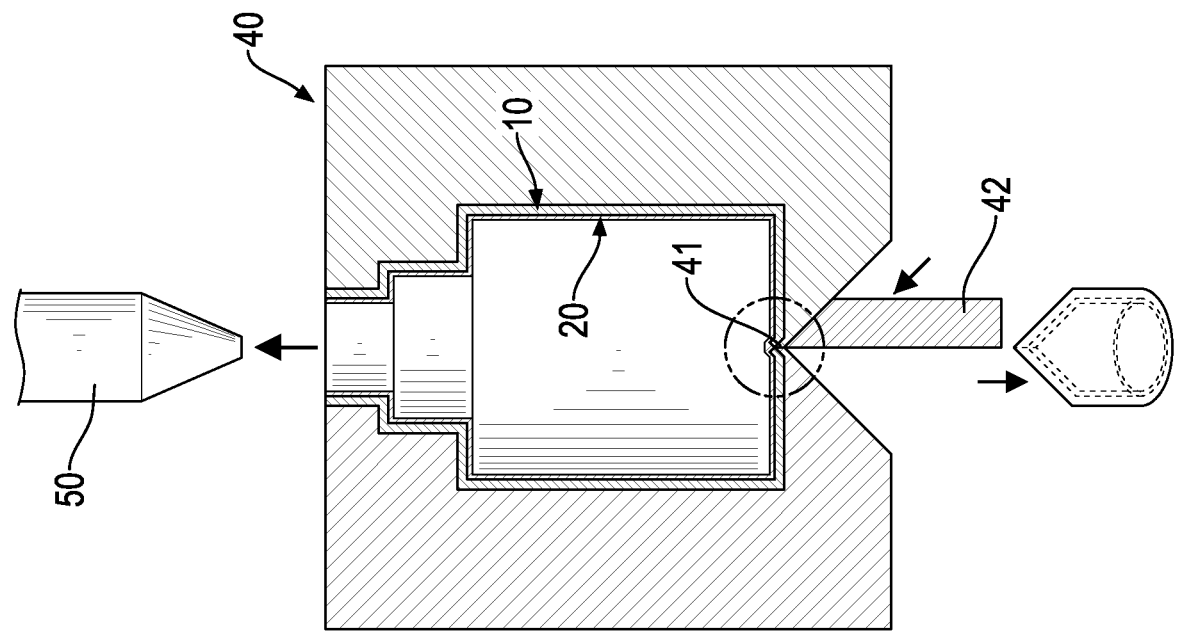
Figure 8:
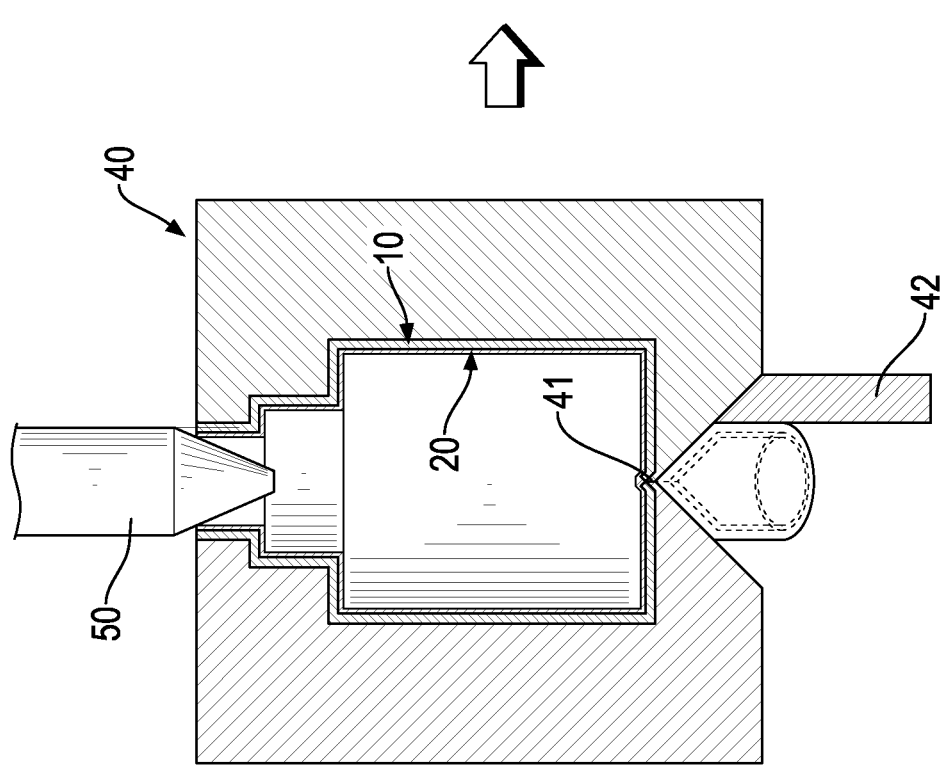

A blow-molding step: with reference to FIG. 8, a nozzle 50 is inserted and injects air into the laminated tube 30 from a top end thereof. The air pressure then pushes the laminated tube 30 out to shape structures of the two halves 40 of the mold to a blow-molded lamination container. Furthermore, the outer layer 10 is formed with a flange 15 matching the stepped groove 401 of the two halves 40. With reference to FIG. 10, by designing widths of the two mold grooves 402, the outer layer 10 may form two positioning protrusions 14 nipping two positioning grooves 22 formed on the inner layer 20.

A cutting step: move the cutting tool 42 upwardly toward the blow-molded lamination container, cut off residues of the outer layer 10 and the inner layer 20, and engrave an opening with a triangular cross section on a bottom of the outer layer 10. Molds with the bottoms in different shapes and the protrusions 41 in different shapes, such as a shape of an arc or a shape of a polygon, the cross section of the opening may be formed as a semicircle or a polygon.

An air-inletting seam forming step: with reference to FIGS. 9 and 11, open the mold, and take out the blow-molded lamination container. Because the blow-molding step causes high temperature, when the blow-molded lamination container cools down, the opening with the triangular cross section would shrink and generate an air-inletting seam 12 naturally. No further process needs to be taken place, and the blow-molded lamination container is thereby made.

With the aforementioned technical features, the blow-molded lamination container in accordance with the present invention has the following advantages.

1. After the cutting tool 42 engraves the opening, the air-inletting seam 12 would be generated naturally. The manufacturing processes may be thereby simplified, and the production cost decreases.

2. The inner layer 20 is not nipped within the air-inletting seam 12 by the outer layer 10 by such manufacturing method, so more air may flow through the air-inletting seam 12 with a passage of a larger cross-sectional area and less resistance.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A blow-molded lamination container comprising:
    an outer layer having
        a bottom;
        an air-inletting seam disposed through the bottom of the outer layer, and formed from a tapering opening by cooling shrinkage; and
    an inner layer disposed in the outer layer, being capable of being filled with a content and contracting with respect to the outer layer, and being not nipped within the air-inletting seam by the outer layer;
    wherein a width of a lower side portion of the air-inletting seam is at least twice greater than a width of an upper side portion of the air-inletting seam.

2. The blow-molded lamination container as claimed in claim 1, wherein the outer layer has
    a top located away from the bottom of the outer layer; and
    a flange formed near the top of the outer layer.

3. The blow-molded lamination container as claimed in claim 1, wherein the inner layer has a circular discharge opening formed through a top of the inner layer.

4. The blow-molded lamination container as claimed in claim 2, wherein the inner layer has a circular discharge opening formed through a top of the inner layer.

5. The blow-molded lamination container as claimed in claim 1, wherein
    the outer layer has two positioning protrusions disposed at two ends of the air-inletting seam; and
    the inner layer has two positioning grooves nipped by the two positioning protrusions.

6. The blow-molded lamination container as claimed in claim 2, wherein
    the outer layer has two positioning protrusions disposed at two ends of the air-inletting seam; and
    the inner layer has two positioning grooves nipped by the two positioning protrusions.

7. The blow-molded lamination container as claimed in claim 3, wherein
    the outer layer has two positioning protrusions disposed at two ends of the air-inletting seam; and
    the inner layer has two positioning grooves nipped by the two positioning protrusions.

8. The blow-molded lamination container as claimed in claim 4, wherein
    the outer layer has two positioning protrusions disposed at two ends of the air-inletting seam; and
    the inner layer has two positioning grooves nipped by the two positioning protrusions.

9. The blow-molded lamination container as claimed in claim 1, wherein the air-inletting seam has a triangular cross section.

10. The blow-molded lamination container as claimed in claim 1, wherein the air-inletting seam has a semicircular cross section.

11. The blow-molded lamination container as claimed in claim 1, wherein the air-inletting seam has a polygonal cross section.

12. A manufacturing method of a blow-molded lamination container comprising the following steps:
    preparing a laminated tube comprising an outer layer and an inner layer;
    setting the laminated tube in a mold composed of two halves, wherein one of the two halves has a cutting tool movably mounted thereon;
    clamping the two halves of the mold, and making the outer layer and the inner layer of the laminated tube compressed by bottoms of the two halves and joined;
    inserting a nozzle and injecting air into the laminated tube from a top end thereof, and pushing the laminated tube out to match the two halves of the mold to be shaped as a blow-molded lamination container;
    moving the cutting tool, cutting off residues of the outer layer and the inner layer, and engraving an opening with a triangular cross section on a bottom of the outer layer; and
    opening the mold, taking out the blow-molded lamination container, and generating an air-inletting seam from the opening with a triangular cross section;
    wherein the inner layer is not nipped within the air-inletting seam by the outer layer.

13. The manufacturing method of a blow-molded lamination container as claimed in claim 12, wherein
    each one of the two halves of the mold has a respective mold groove formed thereon;
    two positioning protrusions are formed on the outer layer in the process of inserting a nozzle and injecting air into the laminated tube from a top end thereof; and
    two positioning grooves are formed on the inner layer and nipped by the two positioning protrusions.

* * * * *